Figure 1:
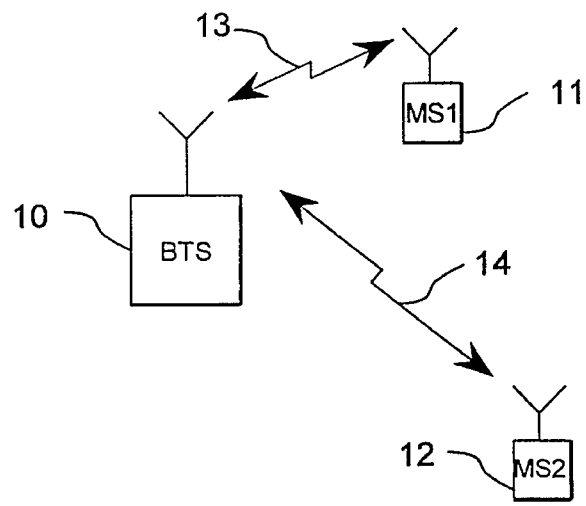

United States Patent [19]
Keskitalo et al.

[11] Patent Number: 5,570,353
[45] Date of Patent: Oct. 29, 1996

[54] METHOD OF TRANSMITTING AND RECEIVING POWER CONTROL MESSAGES IN A CDMA CELLULAR RADIO SYSTEM

[75] Inventors: Ilkka Keskitalo; Kari Rikkinen; Tero Ojanperä, all of Oulu, Finland

[73] Assignees: Nokia Telecommunications Oy, Espoo; Nokia Mobile Phones Ltd., Salo, both of Finland

[21] Appl. No.: 522,325
[22] PCT Filed: Jan. 11, 1995
[86] PCT No.: PCT/FI95/00007
  § 371 Date: Nov. 3, 1995
  § 102(e) Date: Nov. 3, 1995
[87] PCT Pub. No.: WO95/19664
  PCT Pub. Date: Jul. 20, 1995

[30] Foreign Application Priority Data

Jan. 12, 1994 [FI] Finland .................................. 940148

[51] Int. Cl.$^6$ .................................................. H04B 7/005
[52] U.S. Cl. ...................... 370/18; 370/95.1; 370/110.1; 379/59; 379/63; 455/33.1; 455/38.3; 455/54.1
[58] Field of Search .......................... 370/18, 95.1, 95.3, 370/110.1, 111; 379/58, 59, 63; 375/205, 200; 455/13.4, 33.1, 38.3, 53.1, 54.1, 56.1, 68, 69, 70

[56] References Cited

U.S. PATENT DOCUMENTS

| | | | |
|---|---|---|---|
| 5,056,109 | 10/1991 | Gilhousen et al. | 375/205 |
| 5,093,840 | 3/1992 | Shilling | 375/200 |
| 5,257,283 | 10/1993 | Gilhousen et al. | 375/200 |
| 5,265,119 | 11/1993 | Gilhousen et al. | 375/205 |
| 5,267,262 | 11/1993 | Wheatley, III | 375/200 |
| 5,329,547 | 7/1994 | Ling | 375/205 |
| 5,333,175 | 7/1994 | Ariyavisitakul et al. | 379/58 |
| 5,383,219 | 1/1995 | Wheatley, III et al. | 375/205 |
| 5,396,516 | 3/1995 | Padovani et al. | 375/225 |
| 5,461,639 | 10/1995 | Wheatley, III et al. | 375/205 |

FOREIGN PATENT DOCUMENTS

| | | |
|---|---|---|
| 0610030 | 8/1994 | European Pat. Off. . |
| 2268365 | 1/1994 | United Kingdom . |
| 91/07037 | 5/1991 | WIPO . |
| 94/06217 | 3/1994 | WIPO . |

OTHER PUBLICATIONS

Frazen et al., "A Study of Code Division Multiple Access", Lund Institute of Technology, Dec. 5, 1992, pp. 23–34.

Lee, William C. Y., "Power Control in CDMA", *Gateway to thge Future Technology in Motion*, May 19–22, 1991 St. Louis, Mo., pp. 77–80.

*Primary Examiner*—Hassan Kizou
*Attorney, Agent, or Firm*—Cushman Darby & Cushman, L.L.P.

[57] ABSTRACT

The invention relates to a data transmission method in a CDMA cellular radio system, which comprises in each cell at least one base station (10) communicating with mobile stations (11, 12) within its coverage area and in which system the base station adjusts the transmitting power of the mobile stations within its area by means of power control massages. To enable coherent detection at the base station, according to the method the transmission on the traffic channel is performed both in the transmission direction from the mobile station to the base station and from the base station to the mobile station by using a similar frame structure. When the base station transmits a power control message to the mobile station by using bits of the frame structure of the traffic channel, the mobile station transmits a predetermined bit pattern to the base station in the corresponding bits of the other transmission direction of the traffic channel.

5 Claims, 1 Drawing Sheet

METHOD OF TRANSMITTING AND RECEIVING POWER CONTROL MESSAGES IN A CDMA CELLULAR RADIO SYSTEM

The invention relates to a data transmission method in a CDMA cellular radio system, which comprises in each cell at least one base station communicating with mobile stations within its coverage area and in which system a the station adjusts the transmitting power of the mobile stations within its area by means of power control messages.

CDMA is a multiple access method, which is based on the spread spectrum technique and which has been applied recently in cellular radio systems, in addition to the prior FDMA and TDMA methods. CDMA has several advantages over the prior methods, for example spectral efficiency and the simplicity of frequency planning.

In the CDMA method, the narrow-band data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection between a base station and a mobile station, and the signals of the users can be distinguished from one another in the receivers on the basis of the spreading code of each user.

Correlators provided in the receivers are synchronized with a desired signal, which they recognize on the basis of the spreading code. The data signal is restored in the receiver to the original band by multiplying it again by the same spreading code as during the transmitting stage. Signals multiplied by some other spreading code do not correlate in an ideal case and are not restored to the narrow band. They appear thus as noise with respect to the desired signal. The spreading codes of the system are preferably selected in such a way that they are mutually orthogonal, i.e. they do not correlate with each other.

In a typical mobile phone environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays. CDMA differs from the conventional FDMA and TDMA in that the multipath propagation can be exploited in the reception of the signal. The receiver generally utilized in a CDMA system is a so-called rake receiver, which consists of one or more rake branches. Each branch is an independent receiver unit, the function of which is to compose and demodulate one received signal component. Each rake branch can be caused to synchronize with a signal component which has propagated along an individual path, and in a conventional CDMA receiver the signals of the receiver branches are preferably combined, either coherently or non-coherently, whereupon a signal of good quality is achieved.

To ensure the effective operation of the CDMA system, power control has to be used over the connection between a mobile station and a base station. The capacity of the base station can be maximized if it receives with the same signal strength from all mobile stations in its area. The mobile station can measure the strength of the signal it has received from the base station and adjust its transmitting power on the basis of this information. This type of power control method is called "open-loop power control". Furthermore, the base station measures the strength of the signal it has received from the mobile stations and transmits power control messages to the mobile stations which adjust their transmitting power on the basis of these messages. Such a power control method is called "closed-loop power control". These methods may be used simultaneously.

The power control messages required by the closed-loop power control from the base station to a mobile station may be transmitted in two ways to the mobile station. A certain part in the frame structure of a traffic channel may be permanently reserved for power control messages in the transmission direction from base to mobile (i.e. in the downlink direction). This method increases the bandwidth required by the system. The other way is to replace, when necessary, data bits of the user with bits required by the power control messages. In such a case, the bandwidth does not increase, but the quality of the user connection deteriorates slightly when the data bits are replaced with power control messages.

No power control messages are transmitted in the transmission direction from mobile to base (i.e. in the uplink direction). Thus in the uplink direction there would be left unused bandwidth for data transmission, if the frame structure were the same as in the downlink direction. In the conventional systems, the frame structure is therefore designed differently in different transmission directions. However, the same kind of frame structure would be useful due to the similar timing and synchronization requirements of similar frame structures in the transmitter and receiver.

The purpose of the present invention is to enable the use of similar frame structures in both transmission directions in such a way that the bandwidth of the system can be effectively utilized.

This is achieved with the data transmission method described in the preamble, characterized in that both in the transmission direction from the base station to the mobile station and from the mobile station to the base station, the transmission on the traffic channel is performed by using a similar frame structure, and that when the base station transmits a power control message to the mobile station by using bits of the frame structure of the traffic channel, the mobile station transmits a predetermined bit pattern to the base station in the corresponding bits of the other transmission direction of the traffic channel.

In the method according to the invention, a predetermined bit pattern is thus transmitted in the uplink direction in the bit places where the base station in the downlink direction transmits power control information. This makes it possible to utilize the band effectively, since the predetermined bit pattern transmitted by the mobile station enables the base station to receive with a better quality.

In a CDMA cellular radio system, it is possible to use a so-called pilot channel in the downlink direction. A pilot channel is a data-unmodulated signal which is transmitted with a specific spreading code and which does not thus contain any data information. The pilot signal is transmitted using the same frequency band on which the actual traffic channels are situated, the pilot signal being distinguishable from them only on the basis of the spreading code. The pilot signal is a traffic channel known by all users and it is used for example in power measurements and in the generation of a coherent phase reference.

The arrangement according to the invention enables coherent detection also in the uplink direction. This was not possible before, since the phase reference could not be generated. The pilot channel type of arrangement is possible only in the downlink direction. The previously known bit pattern transmitted by the mobile station can be used in the generation of the phase reference, and thus coherent detection is possible. Coherent detection improves the signal-to-noise ratio that can be achieved by about 3 dB, and in the CDMA cellular system this can be seen directly in an almost double capacity.

Figure 2:
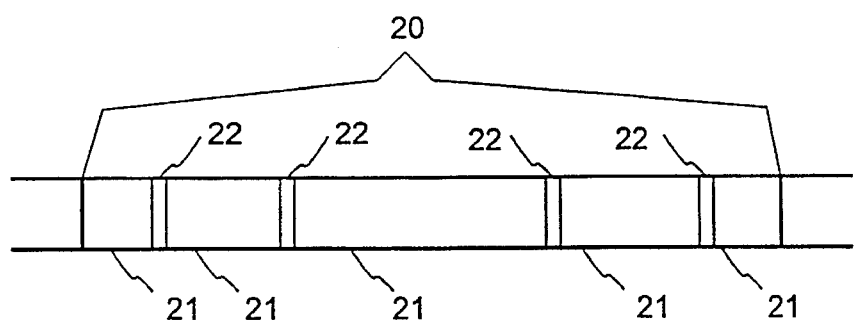
Figure 3A:
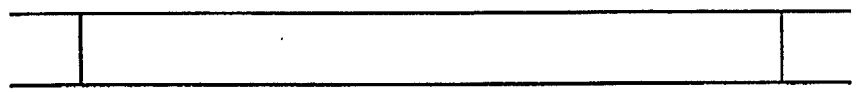
Figure 3B:
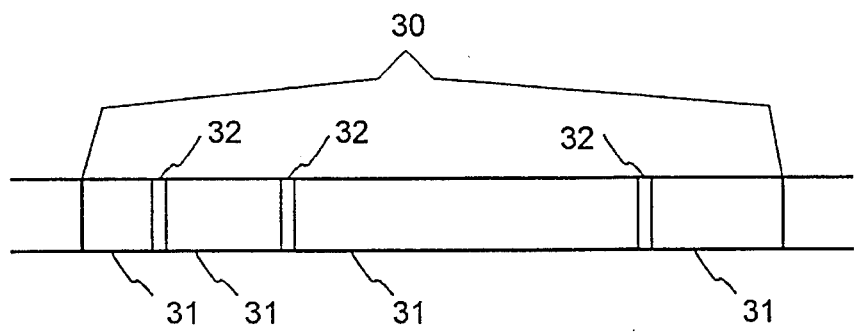

In the following, the invention will be described in greater detail with reference to the examples of the accompanying drawings, in which FIG. 1 illustrates a cellular network where the invention can be applied, FIG. 2 shows a frame structure where a part of the bits in the downlink direction are permanently reserved for power control messages, FIG. 3a shows a frame structure without power control messages, and FIG. 3b shows a frame structure where a part of the data bits in the downlink direction are replaced with a power control message.

FIG. 1 shows schematically a part of a CDMA cellular network system where the method according to the invention can be applied. A base station 10 communicates with mobile stations 11, 12 within its area. The base station adjusts the transmitting power of the mobile stations with power control messages, which are transmitted to each mobile station on traffic channels 13, 14.

A predetermined recurrent frame structure is used on the traffic channels. Frames of a certain length are formed of the data bits to be transmitted, the frames being coded, modulated and transmitted. In addition to data bits, also other information bits, such as a training sequence, power control bits or signalling bits, can be transmitted in a frame. The form of the frame structure depends on the nature of the information to be transmitted. For example, when a connection is being established, certain type of connection-establishing frames which comprise user information are used, and when the connection is already established, traffic frames where most of the bits are data bits are used.

In the first embodiment of the invention, a certain part in the frame structure of the downlink direction is permanently reserved for the transmission of power control messages. The frame structure may thus be like the one shown in FIG. 2. Most of the bits 21 of the frame 20 are used for data transmission, but a part of the bits 22 are reserved for the bits of the power control messages. In the method according to the invention, a similar frame structure is used both in the uplink and downlink transmission direction. Since no power control messages are needed in the uplink direction, a predetermined bit pattern known by the base station may be transmitted in the space reserved for them.

According to one preferred embodiment of the invention, these known bits can be utilized at the base station in the generation of a phase reference for the received signal. By means of the generated phase reference, the received signal can be detected coherently, which in a CDMA network enables an almost double capacity.

According to another preferred embodiment of the invention, known bits can be utilized at the base station in the power measurement of the received signal, which enables better power control than previously. The accuracy of the power control also increases the capacity of the CDMA network, although not as significantly as the coherent detection does.

In another embodiment of the invention, no particular part in the frame structure of the downlink direction is permanently reserved for the transmission of power control messages, but a part of the data bits are replaced, when necessary, with power control bits. Thus the bandwidth required by the system is smaller than in the previous embodiment, but the drawback is the loss of data bits. FIG. 3a shows a frame both in the downlink and uplink direction, where power control messages are not transmitted. When the base station needs a band for transmitting power control messages, it replaces some of the data bits of the frame with the bits of the power control message. FIG. 3b illustrates this situation. The frame structure is thus in principle similar to that of the previous embodiment. The frame now comprises both data bits 31 and power control bits 32. The mobile station must be informed through signalling or by some other means that some of the data bits are replaced with a power control message. In the uplink direction, the frame structure correspondingly changes to now resemble FIG. 3b. Instead of the power control bits, the data bits are now replaced with a predetermined bit pattern known by the base station. This known bit pattern can now be utilized at the base station in the manners described above.

Even though the invention is described above with reference to the example according to the accompanying drawings, it is clear that the invention is not limited thereto, but it can be varied in many ways within the inventive idea disclosed in the appended claims.

We claim:

1. A data transmission method in a CDMA cellular radio system, which comprises in each cell at least one base station (10) communicating with mobile stations (11, 12) within its coverage area and in which system the base station (10) adjusts the transmitting power of the mobile stations (11, 12) within its area by means of power control messages, characterized in that both in the transmission direction from the base station (10) to the mobile station (11, 12) and from the mobile station (11, 12) to the base station (10), the transmission on the traffic channel is performed by using a similar frame structure, and that when the base station (10) transmits a power control message to the mobile station (11, 12) by using bits of the frame structure of the traffic channel, the mobile station (11, 12) transmits a predetermined bit pattern to the base station (10) in the corresponding bits of the other transmission direction of the traffic channel.

2. A method according to claim 1, characterized in that the bits used for the transmission of both the power control message of the base station (10) and correspondingly the predetermined bit pattern of the mobile station (11, 12) are permanently reserved from the frame structure for this purpose.

3. A method according to claim 1, characterized in that the bits used for the transmission of both the power control message of the base station (10) and correspondingly the predetermined bit pattern of the mobile station (11, 12) are temporarily reserved from the frame structure by replacing a number of the data bits of the user with the message or the bit pattern to be transmitted.

4. A method according to claim 1, characterized in that the predetermined bit pattern transmitted by the mobile station (11, 12) is used at the base station (10) for generating a coherent phase reference.

5. A method according to claim 1, characterized in that the predetermined bit pattern transmitted by the mobile station (11, 12) is used at the base station (10) for power measurement.

\* \* \* \* \*